US009211903B2

(12) United States Patent
Lee et al.

(10) Patent No.: US 9,211,903 B2
(45) Date of Patent: Dec. 15, 2015

(54) SMART STROLLER

(71) Applicant: HON HAI PRECISION INDUSTRY CO., LTD., New Taipei (TW)

(72) Inventors: Hou-Hsien Lee, New Taipei (TW); Chang-Jung Lee, New Taipei (TW); Chih-Ping Lo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/482,430

(22) Filed: Sep. 10, 2014

(65) Prior Publication Data

US 2015/0069727 A1    Mar. 12, 2015

(30) Foreign Application Priority Data

Sep. 12, 2013    (TW) .............................. 102132885 A

(51) Int. Cl.
*B62B 7/00* (2006.01)
*B62B 5/04* (2006.01)
*B62B 9/08* (2006.01)

(52) U.S. Cl.
CPC ................. *B62B 5/0414* (2013.01); *B62B 9/08* (2013.01)

(58) Field of Classification Search
CPC .......... B62B 5/0414; B62B 9/08; B62B 7/00; B62B 9/00
USPC ............... 280/304.1, 250, 1, 642, 650, 47.38; 180/167, 316, 65.6, 65.1
See application file for complete search history.

(56) References Cited

U.S. PATENT DOCUMENTS

| 5,382,948 A * | 1/1995 | Richmond .................... 340/5.72 |
| 5,873,425 A * | 2/1999 | Yang ............................ 180/65.6 |
| 7,255,206 B1 * | 8/2007 | Hackbarth et al. .............. 188/19 |
| 2001/0002081 A1 * | 5/2001 | Toppses ..................... 280/250.1 |
| 2004/0195876 A1 * | 10/2004 | Huiban ...................... 297/217.3 |
| 2004/0216943 A1 * | 11/2004 | Kwon et al. ................... 180/316 |
| 2005/0137462 A1 * | 6/2005 | Cho .............................. 600/300 |
| 2005/0269802 A1 * | 12/2005 | Kumar .......................... 280/642 |
| 2005/0279551 A1 * | 12/2005 | LoPresti ....................... 180/167 |
| 2006/0082192 A1 * | 4/2006 | Dubay et al. .................. 296/214 |
| 2007/0050111 A1 * | 3/2007 | Mattes et al. ................... 701/36 |
| 2007/0051566 A1 * | 3/2007 | Marlow .......................... 188/20 |
| 2009/0084617 A1 * | 4/2009 | Holenweg et al. ........... 180/65.1 |
| 2009/0195376 A1 * | 8/2009 | Miller et al. ................ 340/457.1 |
| 2010/0226506 A1 * | 9/2010 | Bayes ............................. 381/86 |
| 2011/0010024 A1 * | 1/2011 | Salisbury ......................... 701/2 |

(Continued)

FOREIGN PATENT DOCUMENTS

| CN | 102120463 A | 7/2011 |
| CN | 102774415 A | 11/2012 |

(Continued)

*Primary Examiner* — Hau Phan
(74) *Attorney, Agent, or Firm* — Novak Druce Connolly Bove + Quigg LLP

(57) ABSTRACT

A smart stroller includes at least one armrest, a processor, a flexible touch sensor, an acceleration sensor, and an automatic brake unit. The flexible touch sensor detects whether the at least one armrest is grasping by a person; if no, the processor controls the acceleration sensor to detect whether the smart stroller is moving. If the processor determines that the armrest is not grasped by the person and the smart stroller is moving, the processor control the at least one automatic brake unit to block the smart strolling to stop the smart stroller from moving.

6 Claims, 4 Drawing Sheets

(56) References Cited

U.S. PATENT DOCUMENTS

2012/0123647 A1* 5/2012 Doi et al. ................. 701/49
2013/0162396 A1* 6/2013 Yang ..................... 340/5.81

FOREIGN PATENT DOCUMENTS

| CN | 103287475 A | 9/2013 |
| TW | 201231335 A | 8/2012 |

* cited by examiner

SMART STROLLER

CROSS-REFERENCE TO RELATED APPLICATIONS

This application claims priority to Taiwanese Patent Application No. 102132885 filed on Sep. 12, 2013, the contents of which are incorporated by reference herein.

FIELD

The subject matter herein generally relates to smart strollers.

BACKGROUND

Strollers are widely used for carrying children or goods. Brake systems is very important to the strollers.

BRIEF DESCRIPTION OF THE DRAWINGS

Implementations of the present technology will now be described, by way of example only, with reference to the attached figures.

DETAILED DESCRIPTION

Figure 1:
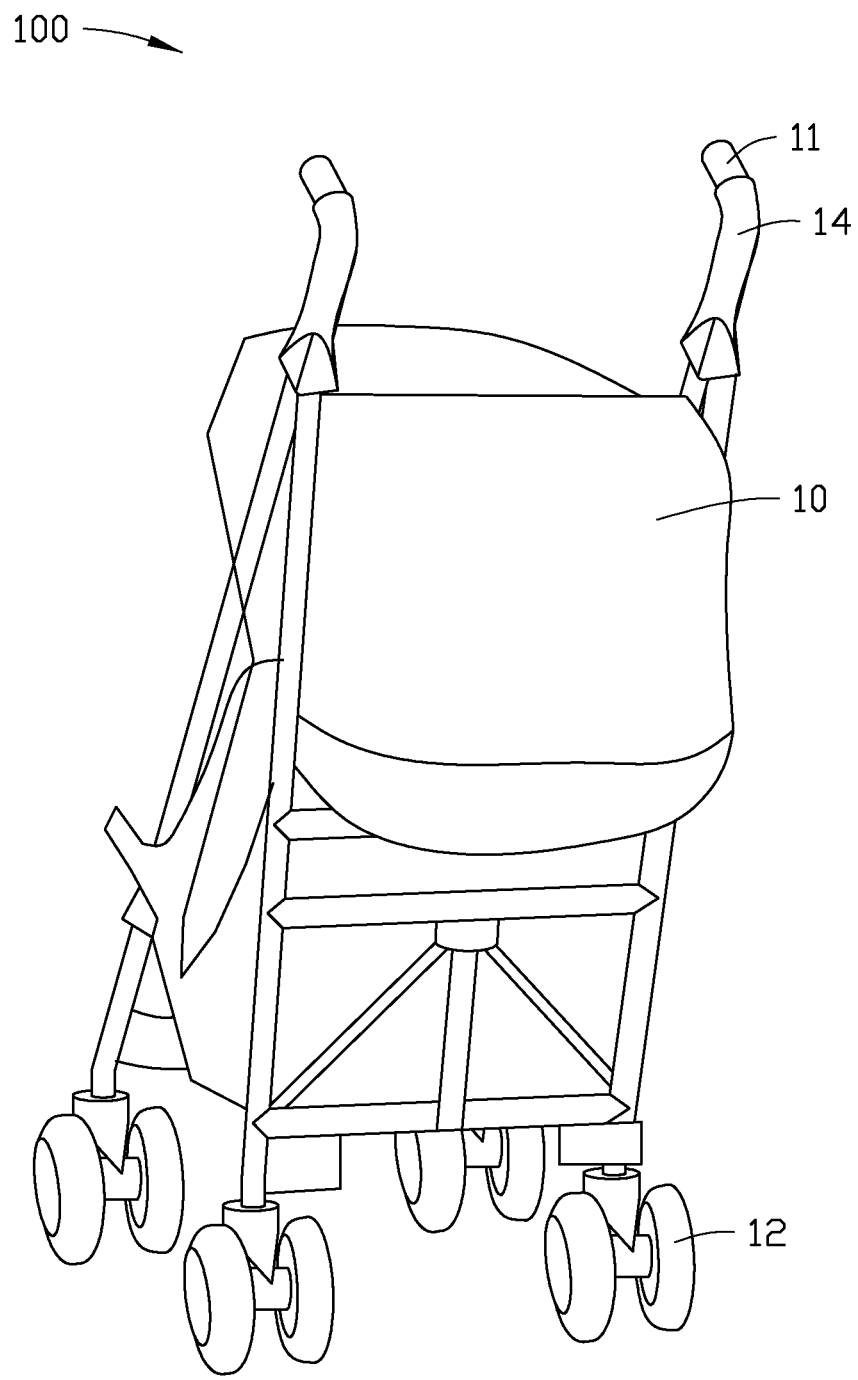
FIG. 1 is an isometric view illustrating an example embodiment of a smart stroller.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein, However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein.

Several definitions that apply throughout disclosure will now be presented. The term "module" refers to logic embodied in computing or firmware, or to a collection of software instruction, written in a programming language, such as Java, C, or assembly. One or more software instruction in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "coupled" is defined as connected, whether directly or indirectly through intervening components, and is not necessarily limited to physical connections. The connection can be such that the objects are permanently connected or releasably connected. The term "comprising" means "including, but not necessarily limited to", it specifically indicates open-ended inclusion or membership in a so-described combination, group, series and the like.

Figure 2:
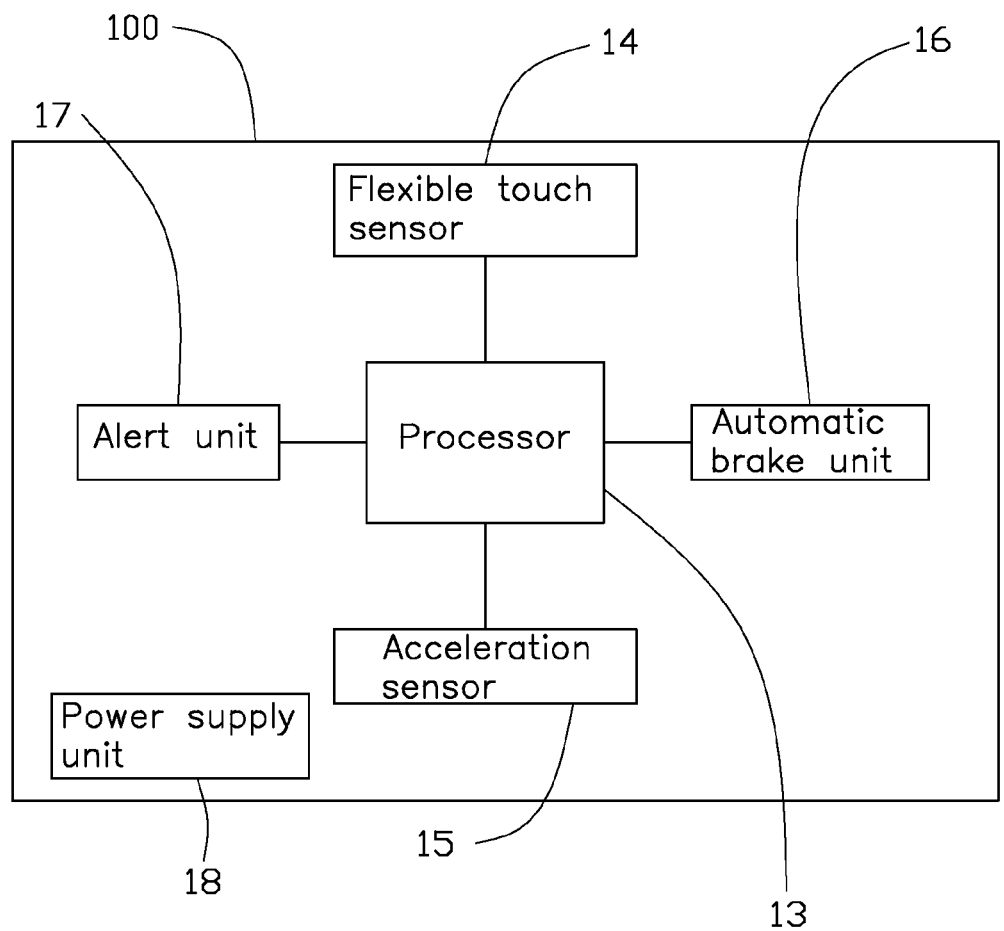
FIG. 2 is a block diagram illustrating an example embodiment of the smart stroller of FIG. 1.

FIG. 1 illustrates a perspective view of a smart stroller 100. In at least one embodiment, the smart stroller 100 can carry children or goods. FIG. 2 is a block diagram of the smart stroller 100. The smart stroller 100 can include a main body 10, at least one armrest 11, a number of wheel units 12, a processor 13, a flexible touch sensor 14, at least one acceleration sensor 15, a number of automatic brake units 16, and an alert unit 17. The flexible touch sensor 14, the acceleration sensors 15, the automatic brake units 16, and the alert unit 17 are all electrically connected to the processor 13. The smart stroller 100 further can include a power supply unit 18 to supply power to the flexible touch sensor 14, the acceleration sensor 15, the automatic brake units 16, and the alert unit 17. In at least one embodiment, the power supply unit 18 can be a solar battery. The acceleration sensor 15 can be an accelerometer.

In at least one embodiment, the flexible touch sensor 14 is mounted on the at least one armrest 11 to detect whether the at least one armrest 11 is grasped by a person. If the flexible touch sensor 14 determines that there is no person grasping the at least one armrest 11, the flexible touch sensor 14 generates an alert signal.

If the processor 13 detects the alert signal generated by the flexible touch sensor 14, the processor 13 controls the alert unit 17 to output an alert to prompt the persons around the smart stroller 100 that there is no person controls the smart stroller 100, and the smart stroller 100 is dangerous. In at least one embodiment, the alert unit 17 can be a loud speaker and/or a light-emitting device, accordingly, the alert can be audio signals output by the loud speaker or light emitted by the light-emitting device.

In at least one embodiment, if the processor 13 detects the alert signal generated by the flexible touch sensor 14, the processor 13 further controls the acceleration sensor 15 to detect whether the smart stroller 100 is moving. In at least one embodiment, the acceleration sensor 15 can be mounted on at least one of the wheel units 12 to detect whether the smart stroller 100 is moving. In other embodiments, the acceleration sensors 15 can be mounted on the other portions of the smart stroller 100 to detect whether the smart stroller 100 is moving.

If the acceleration sensor 15 detects that the smart stroller 100 is moving, the processor 13 controls the automatic brake units 16 to block the wheel units 12 to stop the main body 10 of the smart stroller 100 from moving. In the embodiment, the automatic brake units 16 are mounted on the wheel units 12 to block the wheel units 12 under control of the processor 13. In at least one embodiment, a brake force on each automatic brake unit 16 is gradually enhanced, thus a speed of the smart stroller 100 is gradually slowed down.

In at least one embodiment, if the processor 13 determines that the smart stroller 100 stops moving for a preset time period, the processor 13 controls the automatic brake units 16 to release the wheel units 12, thus the smart stroller 100 can be pushed by users.

Figure 3:
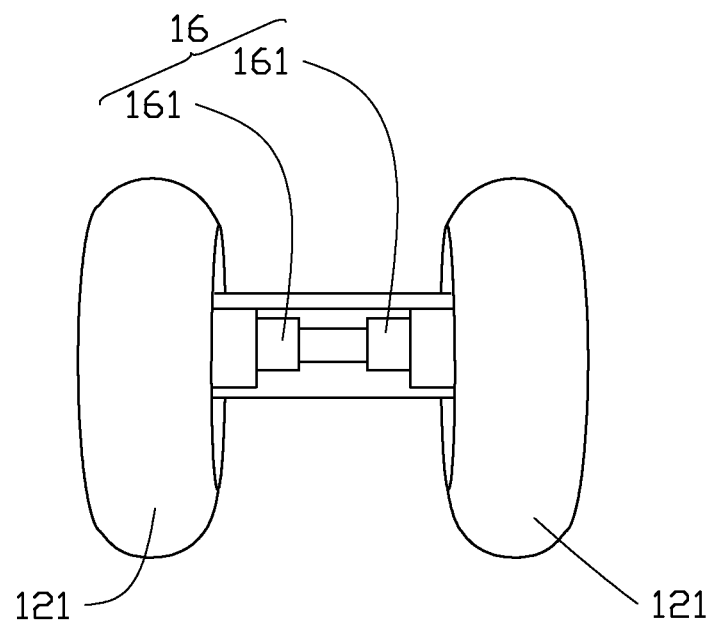
FIG. 3 is a front elevational view illustrating an example of a brake unit of the smart stroller of FIG. 1, which is in a braking state.
Figure 4:
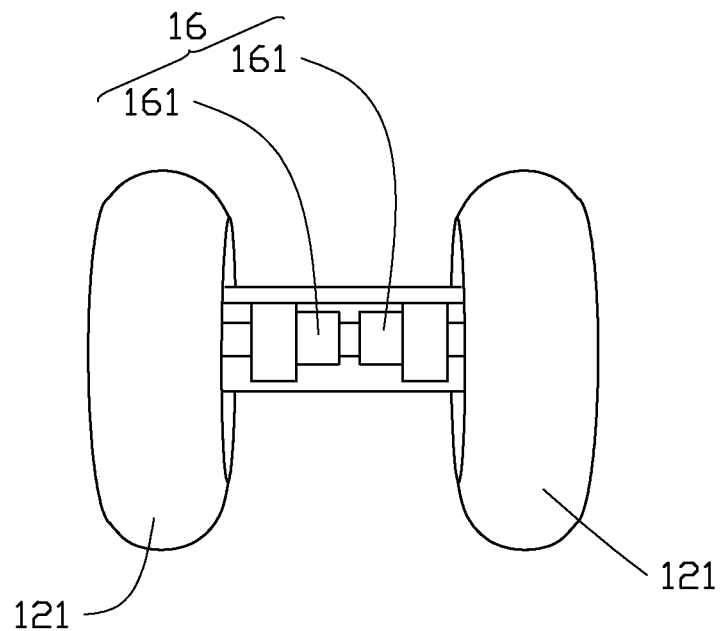
FIG. 4 is a front elevational view illustrating an example of an example of the brake unit of FIG. 3, which is in a non-braking state.

FIG. 3 illustrates a perspective view of a brake unit 16 of the smart stroller 100. In the embodiment, each wheel unit 12 can include two wheels 121, each wheel unit 12 mounted to one of the automatic brake units 16. Each automatic brake unit 16 can include two resisting blocks 161 arranged between the two wheels 12 of the wheel unit 12. Each resisting block 161 corresponds to one of the two wheels 12. The two resisting blocks 161 can be moved close to each other or moved far away from each other. If the two resisting blocks 161 are moved close to each other under the control of the processor 13, the two resisting blocks 161 are far away from the corresponding wheel 12, shown as FIG. 4, thus the wheel 12 can move freely, and the smart stroller 100 can be pushed by the person. If the two resisting blocks 161 are moved far away from each other to tightly resist to the corresponding wheel 12 under the control of the processor 13, the wheels 12 are blocked by the friction between the resisting blocks 161 and the wheels 12, shown as FIG. 3, thus, the stroller 100 cannot be moved.

It can be easily understand that the stroller 100 further can include a manual brake unit (not shown) for the user to brake manually.

The embodiments shown and described above are only examples. Many further details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A smart stroller comprising:
   a main body;
   at least one armrest;
   a processor;
   a flexible touch sensor mounted on the armrest and configured to detect whether the armrest is touched or grasped;
   at least one acceleration sensor coupled to the processor and configured to detect whether the smart stroller is moving when the armrest is not touched or grasped;
   at least one automatic brake unit coupled to the processor and configured to stop the main body from moving if the armrest is not touched or grasped and the smart stroller is moving; and
   wherein if the processor determines that the smart stroller stops moving for a preset time period, the processor controls the automatic brake unit to release the wheel units, allowing the smart stroller to be moved.

2. The smart stroller of claim 1, further comprising an alert unit, wherein if the flexible touch sensor determining that the armrest is not touched or grasped, the flexible touch sensor generates an alert signal, the processor controls the alert unit to output an alert according to the alert signal generated by the flexible touch sensor.

3. The smart stroller of claim 2, wherein the alert unit is a loud speaker and/or a light-emitting device.

4. The smart stroller of claim 1, wherein each wheel unit comprises two wheels, each wheel unit mounted one automatic brake unit, each automatic brake unit comprises two resisting blocks arranged between the two wheels of the wheel unit, each resisting block corresponds to one of the two wheels, the two resisting blocks can be moved close to each other or far away from each other; if the two resisting blocks are moved close to each other, the two resisting blocks are far away from corresponding wheel, thus the stroller can be moved; if the two resisting blocks are moved far away from each other to tightly resist to a corresponding wheel, the wheels are blocked by the friction between the resisting blocks and the wheels, the stroller cannot be moved.

5. The smart stroller of claim 1, further comprising a power supply unit to supply power to the flexible touch sensor, the at least one acceleration sensor, the at least one automatic brake unit, and the alert unit.

6. The smart stroller of claim 1, wherein a brake force of each automatic brake unit is gradually enhanced, thus a speed of the smart stroller is gradually slowed down.

* * * * *